United States Patent
Ishihara et al.

(10) Patent No.: US 9,624,349 B2
(45) Date of Patent: Apr. 18, 2017

(54) POLYOLEFIN MICROPOROUS FILM AND METHOD FOR PRODUCING SAME

(71) Applicant: Toray Battery Separator Film Co., Ltd., Nasushiobara (JP)

(72) Inventors: Takeshi Ishihara, Nasushiobara (JP); Koichi Kono, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 245 days.

(21) Appl. No.: 14/367,342

(22) PCT Filed: Dec. 12, 2012

(86) PCT No.: PCT/JP2012/082199
§ 371 (c)(1),
(2) Date: Jun. 20, 2014

(87) PCT Pub. No.: WO2013/099607
PCT Pub. Date: Jul. 4, 2013

(65) Prior Publication Data
US 2015/0005405 A1 Jan. 1, 2015

(30) Foreign Application Priority Data
Dec. 28, 2011 (JP) .................. 2011-287664

(51) Int. Cl.
| B01D 69/00 | (2006.01) |
| B01D 71/00 | (2006.01) |
| C08J 9/00 | (2006.01) |
| C08J 9/28 | (2006.01) |
| H01M 2/16 | (2006.01) |
| B29C 47/00 | (2006.01) |
| B29D 99/00 | (2010.01) |
| C08L 23/06 | (2006.01) |
| H01M 2/14 | (2006.01) |
| B29L 31/00 | (2006.01) |
| B29C 55/12 | (2006.01) |

(52) U.S. Cl.
CPC ............. *C08J 9/28* (2013.01); *B29C 47/0004* (2013.01); *B29D 99/005* (2013.01); *C08L 23/06* (2013.01); *H01M 2/145* (2013.01); *H01M 2/1653* (2013.01); *B29C 47/0021* (2013.01); *B29C 47/0057* (2013.01); *B29C 55/12* (2013.01); *B29K 2823/0683* (2013.01); *B29L 2031/755* (2013.01); *C08J 2323/06* (2013.01); *C08J 2423/06* (2013.01); *C08J 2423/12* (2013.01); *C08L 2203/20* (2013.01); *C08L 2205/025* (2013.01); *C08L 2205/03* (2013.01); *C08L 2207/062* (2013.01); *C08L 2207/068* (2013.01)

(58) Field of Classification Search
None
See application file for complete search history.

(56) References Cited

U.S. PATENT DOCUMENTS

| 2007/0190303 | A1 | 8/2007 | Lee et al. |
| 2010/0297491 | A1* | 11/2010 | Ishihara ............... B01D 69/125 429/145 |
| 2011/0027660 | A1 | 2/2011 | Takeda et al. |
| 2011/0171523 | A1* | 7/2011 | Samii .................... H01M 2/145 429/188 |

FOREIGN PATENT DOCUMENTS

| JP | 05-234578 | 9/1993 |
| JP | 11-269290 | 10/1999 |
| JP | 2001-183432 | 7/2001 |
| JP | 2002-105235 | 4/2002 |
| JP | 2004-152614 | 5/2004 |
| JP | 2009-518497 | * 5/2009 |
| JP | 2011-111484 | 6/2011 |
| WO | 2005/113657 | 12/2005 |
| WO | 2007/015416 | 2/2007 |
| WO | 2009/123015 | 10/2009 |

* cited by examiner

*Primary Examiner* — Kara Boyle

(74) *Attorney, Agent, or Firm* — DLA Piper LLP (US)

(57) ABSTRACT

A polyolefin microporous membrane is produced by forming a gel-like molding using a polyolefin resin containing polypropylene, and stretching the molding in at least one direction, followed by washing, the polyolefin microporous membrane having an injection of electrolyte of 20 seconds or less and a uniform polypropylene distribution in at least one plane perpendicular to the thickness direction.

7 Claims, 3 Drawing Sheets

POLYOLEFIN MICROPOROUS FILM AND METHOD FOR PRODUCING SAME

TECHNICAL FIELD

The present invention relates to a polyolefin microporous membrane and a method of producing the same, and particularly relates to a polyolefin microporous membrane that is excellent in oxidation resistance, mechanical properties, and permeability and useful as a battery separator, and a method of producing the same.

BACKGROUND ART

Polyolefin microporous membranes are used in various applications such as battery separators, separation membranes for electrolytic capacitors, various filters, moisture-permeable waterproof clothing, reverse osmosis filtration membranes, ultrafiltration membranes, and microfiltration membranes. When a polyolefin microporous membrane is used as a battery separator, particularly as a lithium ion battery separator, the performance of the membrane is highly responsible for battery properties, battery productivity, and battery safety. Therefore, the membrane requires excellent permeability, mechanical properties, heat shrinkage resistance, shutdown property, meltdown property, and the like. For example, if the membrane has low mechanical strength, when it is used as a battery separator, the voltage of the battery can be reduced by a short circuit between electrodes.

To improve the physical properties of polyolefin microporous membranes, studies have been made to improve material composition, stretching conditions, heat treatment conditions, and the like.

PRIOR ART DOCUMENTS

Patent Documents

For example, a polyolefin microporous membrane having excellent permeation performance and mechanical strength as well as improved moldability, and improved permeability and retentivity of an electrolyte solution has been proposed which is obtained by adding a specific amount of polypropylene to ultra-high molecular weight polyethylene or a composition thereof to cause micro-roughness on the surface of the polyolefin microporous membrane [JP 11-269290 A (Patent Document 1)]. The microporous membrane described is a polyolefin microporous membrane comprising a polyolefin composition containing 70 to 95% by weight of polyethylene having a weight average molecular weight of $5 \times 10^5$ or more or a polyethylene composition thereof and 5 to 30% by weight of polypropylene having a weight average molecular weight of $1 \times 10^4$ or more, wherein thickness change between squares with a side length of 1 mm or less adjacent to each other in the surface direction of the membrane surface is ±1 μm or more.

When a membrane is formed by adding a specific polyolefin such as polypropylene to polyethylene and blending them, the polyolefin can segregate on the surface to reduce the near-surface polyethylene content, and as a microporous membrane having such a surface which is able to prevent gas generation during high-temperature storage and decrease in discharge capacity, JP 2004-152614 A (Patent Document 2) has proposed a single-layer microporous membrane containing 50% by weight or more of polyethylene, wherein the near-surface polyethylene content at at least one surface of the membrane is smaller than the average of the whole membrane. It is described that this microporous membrane contains polypropylene having a viscosity average molecular weight of 200,000 or more and low molecular weight polypropylene having a viscosity average molecular weight of 50,000 or less each in an amount of 5 to 20% by weight of all the material components.

JP 05-234578 A (Patent Document 3) has proposed a battery separator having excellent mechanical properties and enhanced safety and including an organic electrolyte solution, the separator comprising polyethylene having a specific molecular weight distribution and polypropylene having a weight average molecular weight in a specific range as a polymer component, and a mixture of inorganic fine powder and organic liquid as a membrane forming material, whereby the pressure does not increase during forming a membrane even when the percentage of ultra-high molecular weight portions in the molecular weight distribution of polyethylene is increased. This separator is composed of a microporous membrane comprising a matrix containing polyethylene comprising portions where the molecular weight is 1,000,000 or more in an amount of 10% by weight or more and portions where the molecular weight is 100,000 or less in an amount of 5% by weight or more and polypropylene having a weight average molecular weight of 10,000 to 1,000,000. The amount of the polypropylene is 5 to 45% by weight of the total weight of polyethylene and polypropylene, and the microporous membrane has a thickness of 10 to 500 μm, a porosity of 40 to 85%, a maximum pore size of 0.05 to 5 μm, and a difference between a meltdown temperature and a shutdown temperature of 28 to 40° C.

JP 2011-111484 A (Patent Document 4) has proposed a polyolefin microporous membrane having a bubble point of 400 to 600 kPa and comprising 5 to 50% by mass of a polypropylene component and 50 to 95% by mass of a polyethylene component, wherein the polyethylene component comprises ultra-high molecular weight polyethylene, and the temperature difference between the melting point of the polyethylene component (Tme) and the melting point of the polypropylene component (Tmp), Tmp−Tme, is more than −20° C. but less than 23° C. The document states that a polyolefin microporous membrane suitable as a separator that can simultaneously achieve oxidation resistance and cycle characteristics can be provided.

WO 2007/015416 (Patent Document 5) has proposed a polyolefin microporous membrane comprising polyethylene and polypropylene having a viscosity average molecular weight of 100,000 or more, wherein the polypropylene is contained in an amount of 4 wt % or more, and the number of terminal vinyl groups per 10,000 carbon atoms in the polyolefin constituting the microporous membrane as determined by infrared spectroscopy is at least two. It is disclosed that this microporous membrane has achieved both membrane rupture resistance and a low heat-shrinking property, and has excellent fuse properties and a uniform thickness.

In addition to the Patent Documents described above, JP 2001-183432 A (Patent Document 6), JP 2002-105235 A (Patent Document 7), and WO 2005/113657 (Patent Document 8) have also proposed a polyethylene microporous membrane into which polypropylene is introduced.

Patent Document 1: JP 11-269290 A
Patent Document 2: JP 2004-152614 A
Patent Document 3: JP 05-234578 A
Patent Document 4: JP 2011-111484 A
Patent Document 5: WO 2007/015416
Patent Document 6: JP 2001-183432 A Patent Document 7: JP 2002-105235 A
Patent Document 8: WO 2005/113657

SUMMARY OF THE INVENTION

Problems to be Solved by the Invention

As described in Patent Documents 1 to 5, attempts have been made to introduce polypropylene into a polyethylene microporous membrane to thereby improve the physical properties of the microporous membrane. However, there has been a disadvantage in that a significant amount of polypropylene needs to be introduced in order to improve heat resistance or oxidation resistance, and as the amount of polypropylene increases, the permeability-strength balance of the polyethylene microporous membrane is impaired, specifically, the strength is reduced.

The polyethylene microporous membranes into which polypropylene is introduced described in Patent Documents 6 to 8 all had an insufficient permeability-strength balance.

Thus, to ensure the productivity and safety of a battery, it is required to improve oxidation resistance and, at the same time, maintain the excellent permeability-strength balance that a polyethylene microporous membrane has.

Thus, the present invention aims to provide a polyolefin microporous membrane excellent in oxidation resistance, mechanical properties, permeability, and injection of electrolyte.

Means for Solving the Problems

To solve the problems described above, the polyolefin microporous membrane of the present invention has the following constitution:

A polyolefin microporous membrane produced by forming a gel-like molding using a polyolefin resin containing polypropylene, and stretching the molding in at least one direction, followed by washing, the polyolefin microporous membrane having an injection of electrolyte of 20 seconds or less and a uniform polypropylene distribution in at least one plane perpendicular to the thickness direction.

The method of producing the polyolefin microporous membrane of the present invention has the following constitution:

A method of producing the above-described polyolefin microporous membrane, comprising the steps of:

(a) melt blending a polyolefin resin composed mainly of polyethylene, comprising 1 to 50% by mass of ultra-high molecular weight polyethylene having a mass average molecular weight of $1\times10^6$ or more, and 0.5% or more but less than 5% by mass of polypropylene having a weight average molecular weight of more than 50,000 but less than 300,000, based on 100% by mass of the total amount of the polyolefin, with a membrane-forming solvent;

(b) extruding the obtained melt blending through a die at a shear rate of 60/sec or more, and cooling the extrudate at a cooling rate of 30° C./sec or more to form a gel-like molding;

(c) stretching the obtained gel-like molding in at least one direction; and (d) removing the membrane-forming solvent from the obtained stretched product.

In the polyolefin microporous membrane of the present invention, the polyolefin resin preferably contains polypropylene having a weight average molecular weight of more than 50,000 but less than 300,000 in an amount of 0.5% by mass or more but less than 5% by mass.

The polyolefin microporous membrane of the present invention preferably has a normalized PP/PE ratio whose average is 0.5 or more, whose standard deviation is 0.2 or less, and whose kurtosis is 1.0 or less, as measured by Raman spectroscopy in at least one plane perpendicular to the thickness direction.

In the polyolefin microporous membrane of the present invention, the weight average molecular weight of polypropylene is preferably more than 50,000 but less than 150,000.

In the polyolefin microporous membrane of the present invention, the weight average molecular weight of polypropylene is preferably more than 50,000 but less than 150,000.

The polyolefin microporous membrane of the present invention preferably contains an ultra-high molecular weight polyethylene having a mass average molecular weight of $1\times10^6$ or more in an amount of 1 to 50% by weight based on 100% by mass of the total amount of the polyolefin resin.

The microporous membrane of the present invention was found to have a polyethylene content at the membrane surface of not smaller than the average of the whole membrane, which is unlike the invention disclosed in Patent Document 2, and have improved oxidation resistance even if the number of terminal vinyl groups per 10,000 carbon atoms in the polyolefin constituting the microporous membrane as determined by infrared spectroscopy is not at least two, which is unlike the invention disclosed in Patent Document 5. Since the amount of polypropylene is less than 5% by mass, the thickness change as seen in Patent Document 1 is not observed, and the thickness distribution is uniform. Further, it was discovered that using polypropylene having a specific molecular weight provides a microporous membrane having a uniform polypropylene distribution (hereinafter referred to as PP distribution) in at least one plane perpendicular to the thickness direction as analyzed by micro-Raman spectroscopy, and a small amount of the polypropylene improves oxidation resistance.

Although the polypropylene content in the microporous membrane of the present invention is small, polypropylene delocalized in a plane perpendicular to the thickness direction is considered to contribute to inhibition of the oxidation reaction in a battery. An amount of 0.5% by mass or more contributes sufficiently to oxidation stability, and an amount of less than 5% by mass will not increase the thickness deviation or reduce the strength, and, therefore, the amount is preferably in this range.

Effects of the Invention

The polyolefin microporous membrane of the present invention has a uniform PP distribution in at least one plane perpendicular to the thickness direction as analyzed by micro-Raman spectroscopy, and therefore polypropylene which contributes to oxidation resistance is delocalized in a plane in contact with an electrode. Consequently, a separator in a battery is less prone to partial degradation. In addition, since the amount of polypropylene to be added is small, the polyolefin microporous membrane has excellent balance between air permeability and pin puncture strength and exhibits an injection of electrolyte equivalent to that of polyethylene microporous membranes. Thus, when the polyolefin microporous membrane of the present invention is used as a battery separator, the productivity of the battery is improved, and the life of the battery is extended by its excellent cycle characteristics.

According to the production method of the present invention, a polyolefin composition containing less than 5% by mass of polypropylene having a specific molecular weight is used to form a gel-like molding. This is stretched, washed, stretched again to a predetermined magnification, and then heat-treated, whereby a polyolefin microporous membrane having properties as described above can be stably and efficiently produced.

BEST MODE FOR CARRYING OUT THE INVENTION

[1] Polyolefin Resin

Figure 1:
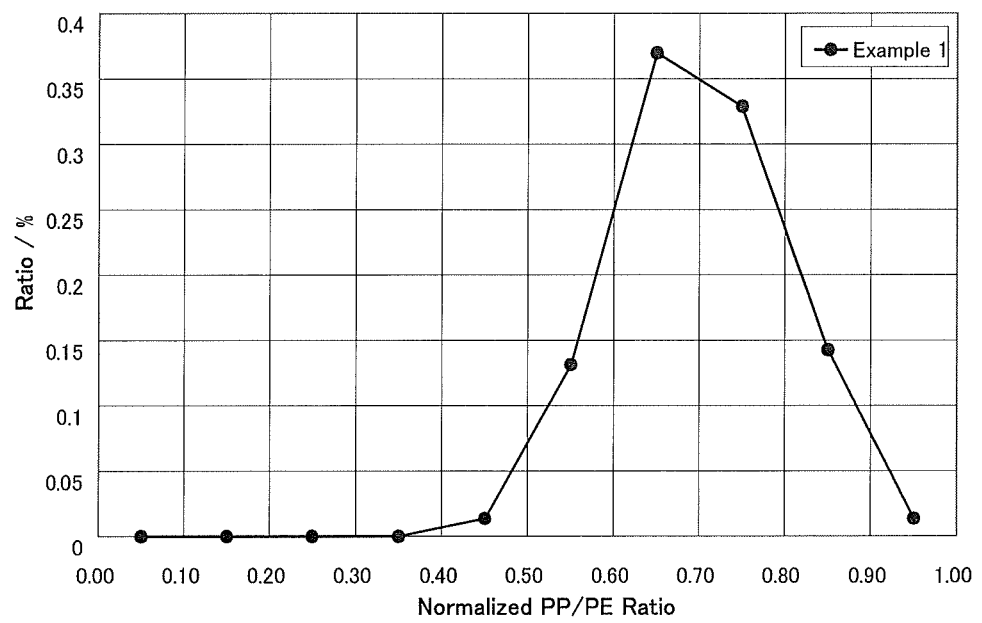
FIG. 1 is a graph showing a distribution chart of the normalized PP/PE ratio of Example 1.

The polyolefin resin constituting the polyolefin microporous membrane of the present invention is preferably composed mainly of polyethylene (hereinafter referred to as PE). The polyolefin resin may be one comprising PE in addition to polypropylene having a specific molecular weight, a composition comprising PE and any other polyolefins, or a composition comprising a resin other than polyolefins. Thus, it should be understood that the term "polyolefin resin" may include resins comprising not only polyolefins but also a resin other than polyolefins. However, in the polyolefin resin, the percentage of PE is preferably 80% by mass or more, more preferably 90% by mass or more, based on 100% by mass of the total amount of the polyolefin resin.

A preferred PE is (a) PE having a Mw of less than $1 \times 10^6$ (hereinafter referred to as "PE (A)" unless otherwise specified) or (b) a composition comprising PE (A) and ultra-high molecular weight PE (UHMwPE) having a Mw of not less than $1 \times 10^6$ (hereinafter referred to simply as "PE composition (B)" unless otherwise specified).

PE (A) may be any of high-density PE (HDPE), medium-density PE (MDPE), and low-density PE (LDPE), and HDPE is preferred. The Mw of PE (A) is preferably not less than $1 \times 10^4$ but less than $5 \times 10^5$. In particular, the Mw of HDPE is more preferably not less than $5 \times 10^4$ but less than $4 \times 10^5$. Two or more PEs different in Mw or density may be used as PE (A). PE (A) may be not only a homopolymer of ethylene but also a copolymer containing a small amount of other α-olefins. Examples of other α-olefins other than ethylene include propylene, butene-1, hexene-1, pentene-1, 4-methylpentene-1, octene, vinyl acetate, methyl methacrylate, and styrene.

When PE is PE composition (B), the content of UHMwPE is preferably not more than 50% by mass based on 100% by mass of the total amount of PE. The content of more than 50% by mass leads to an increased pressure during molding, resulting in reduced productivity. The lower limit of this content is not critical, and in order to maintain mechanical strength and a high meltdown temperature (MD temperature), it is more preferably 1% by mass or more, particularly preferably 5% by mass or more. The Mw of UHMwPE is preferably in the range of $1 \times 10^6$ to $3 \times 10^6$. When the Mw of UHMwPE is not more than $3 \times 10^6$, melt extrusion can be easily carried out. UHMwPE may be not only a homopolymer of ethylene but also a copolymer containing a small amount of other α-olefins. Other α-olefins other than ethylene may be the same as those described above.

Mw/Mn (molecular weight distribution), the ratio of Mw to number average molecular weight (Mn), of PE (A) and PE composition (B) is not critical, and it is preferably in the range of 5 to 300, more preferably in the range of 5 to 100, and particularly preferably in the range of 5 to 25. When Mw/Mn is less than 5, it is difficult to extrude a PE solution because of too much high molecular weight components, and when Mw/Mn is more than 300, the resulting microporous membrane has low strength because of too much low molecular weight components. Mw/Mn is used as an index of molecular weight distribution, and higher values correspond to wider molecular weight distributions. Namely, in the case of PE comprising a single substance, Mw/Mn indicates the breadth of its molecular weight distribution, and higher values correspond to wider molecular weight distributions. The Mw/Mn of PE comprising a single substance can be appropriately adjusted by preparing the PE using multistage polymerization. A preferred multistage polymerization method is two-stage polymerization in which high molecular weight components are polymerized in a first stage, and low molecular weight components are polymerized in a second stage. When PE is a composition, the difference in Mw of components to be mixed increases as the Mw/Mn increases, and the difference in Mw decreases as the Mw/Mn decreases. The Mw/Mn of PE composition (B) can be appropriately adjusted by adjusting the molecular weight or mixing ratio of the components.

To improve the properties for battery separator applications, the polyolefin resin may contain a polyolefin for providing a shutdown function. For example, LDPE and PE wax can be added as the polyolefin for providing a shutdown function. LDPE is preferably at least one selected from the group consisting of branched LDPE, linear LDPE (LLDPE), and ethylene/α-olefin copolymers produced using a single-site catalyst. The amount of LDPE is preferably not more than 40% by mass based on 100% by mass of the total amount of the polyolefin resin. A large amount of LDPE leads to significantly reduced strength.

When the polyolefin resin comprises PE composition (B), either polybutene-1 having a Mw of $1 \times 10^4$ to $4 \times 10^6$ or an ethylene/α-olefin copolymer having a Mw of $1 \times 10^4$ to $4 \times 10^6$ may be added as an optional component. The amount thereof is preferably not more than 40% by mass based on 100% by mass of the total amount of the polyolefin resin.

Polypropylene (hereinafter referred to as PP) may be not only a homopolymer but also a block copolymer and/or random copolymer comprising any other α-olefin or diolefin. The other olefin is preferably ethylene or a $C_4$-$C_8$ α-olefin. Examples of $C_4$-$C_8$ α-olefins include 1-butene, 1-hexene, and 4-methyl-1-pentene. The number of carbon atoms in the diolefin is preferably 4 to 14. Examples of $C_4$-$C_{14}$ diolefins include butadiene, 1,5-hexadiene, 1,7-octadiene, and 1,9-decadiene. The content of the other olefin or diolefin is preferably less than 10 mol % based on 100 mol % of the propylene copolymer.

The Mw of PP is preferably more than $5 \times 10^4$ but less than $3 \times 10^5$, more preferably more than $5 \times 10^4$ but less than $1.5 \times 10^5$. The molecular weight distribution (Mw/Mn) of PP is preferably 1.01 to 100, more preferably 1.1 to 50. PP may be a single substance or a composition comprising two or more PPs. The melting point of PP is preferably 150 to 175° C., but is not limited thereto.

As described above, the polyolefin resin may be a composition containing a polyolefin other than PE and PP and a resin other than polyolefins. Examples of polyolefins other than PE and PP include homopolymers and copolymers of pentene-1, hexene-1,4-methylpentene-1, and octene as well as polybutene-1. Examples of resins other than polyolefins include homopolymers and copolymers of vinyl acetate, methyl methacrylate, and styrene, and in addition, polyesters, fluororesins, polyamides (PA), polyarylene sulfides (PAS), polyvinyl alcohols (PVA), polyimides (PI), polyamide-imide (PAI), polyethersulfone (PES), polyether ether ketone (PEEK), polycarbonates (PC), cellulose acetate, cellulose triacetate, polysulfone, and polyetherimide. Such a polyolefin other than PE and a resin other than polyolefins are preferably heat resistant.

The heat resistant resin preferably has a melting point or glass transition temperature (Tg) of 150° C. or higher. "Having a melting point or Tg of 150° C. or higher" means that when the heat resistant resin is a crystalline resin (including a partially crystalline resin), it has a melting point of 150° C. or higher, and when the heat resistant resin is an amorphous resin, it has a Tg of 150° C. or higher. The melting point and Tg can be measured according to JIS K 7121. The melting point or Tg of the heat resistant resin is more preferably 170 to 260° C.

When the polyolefin resin contains a heat resistant resin, the polyolefin microporous membrane has an improved rupture temperature (MD temperature) when used as a battery separator, leading to further improved high-temperature preservability of a battery.

As the heat resistant resin, the resins described in WO 2006/137540 can be used, and specific examples thereof include polyesters such as polybutylene terephthalate and polyethylene terephthalate; fluororesins such as polymethylpentene [PMP or TPX (Transparent Polymer X)], polyvinylidene fluoride, and polytetrafluoroethylene; polyamides (PA, melting point: 215 to 265° C.) such as polyamide 6 and polyamide 66; polyarylene sulfides (PAS) such as polyphenylene sulfide; polystyrene (PS, melting point: 230° C.); polyvinyl alcohols (PVA, melting point: 220 to 240° C.); polyimides (PI, Tg: 280° C. or higher); polyamide-imide (PAI, Tg: 280° C.); polyethersulfone (PES, Tg: 223° C.); polyether ether ketone (PEEK, melting point: 334° C.); polycarbonates (PC, melting point: 220 to 240° C.); cellulose acetate (melting point: 220° C.); cellulose triacetate (melting point: 300° C.); polysulfone (Tg: 190° C.); and polyetherimide (melting point: 216° C.). In particular, the heat resistant resin is preferably at least one selected from the group consisting of polyester and polymethylpentene. The heat resistant resin may be composed not only of a single resin component but also of several resin components.

The amount of the heat resistant resin is preferably 3 to 20% by mass, more preferably 3 to 15% by mass, based on 100% by mass of the total amount of the polyolefin resin. If this amount is more than 20% by mass, mechanical strength such as pin puncture strength and tensile rupture strength will be significantly reduced.

The microporous membrane of the present invention may be used as a surface layer of a multi-layer membrane; multi-layering provides an improved air permeability-strength balance that cannot be achieved by a monolayer membrane and an improved meltdown temperature (MD temperature) due to a combination with a heat resistant resin in the central layer, thereby further improving battery properties. The heat resistant resin is preferably at least one selected from the group consisting of polypropylene, polybutylene terephthalate, and polymethylpentene.

[2] Method of Producing Polyolefin Microporous Membrane

The method of producing the polyolefin microporous membrane of the present invention includes the steps of (1) adding a membrane-forming solvent to the polyolefin resin described above, and then melt blending the resulting mixture to prepare a polyolefin resin solution, (2) extruding the polyolefin resin solution through a die lip, and then cooling the extrudate to form a gel-like molding, (3) stretching the gel-like molding in at least one direction (first stretching step), (4) removing (washing off) the membrane-forming solvent, (5) drying the resulting membrane, (6) stretching the dried membrane again in at least one direction (second stretching step), and (7) performing a heat treatment. Optionally, any one of a heat setting treatment step, a hot roll treatment step, and a hot solvent treatment step can be conducted prior to (4) membrane-forming solvent removing step. Further, after the steps of (1) to (7), a drying step, a heat treatment step, a cross-linking treatment step with ionizing radiation, a hydrophilizing treatment step, a surface coating treatment step, and the like can be carried out.

(1) Preparation of Polyolefin Resin Solution

An appropriate membrane-forming solvent is added to the polyolefin resin, and then the resulting mixture was melt blended to prepare a polyolefin resin solution. The solvent may be any solvent as long as it can sufficiently dissolve the polyolefin. The use of a liquid membrane-forming solvent makes it possible to conduct stretching at relatively high magnifications. Examples of liquid solvents include aliphatic, alicyclic, and aromatic hydrocarbons such as nonane, decane, decalin, p-xylene, undecane, dodecane, and liquid paraffin; mineral oil distillates having boiling points comparable to those of the above hydrocarbons; and phthalates liquid at room temperature, such as dibutyl phthalate and dioctyl phthalate. Mixtures thereof can also be used. The use of a non-volatile liquid solvent such as liquid paraffin makes it easy to obtain a gel-like molding (gel-like sheet) having a stable liquid solvent content, but this is not a limiting example.

In one embodiment, one or more solvents that are miscible with the polyolefin composition in a melt-blended state but solid at room temperature may be added to the liquid solvent. Examples of such solid solvents include stearyl alcohol, ceryl alcohol, and paraffin wax. The solid solvent can be used without a liquid solvent, but in this case, is can be difficult to uniformly stretch the gel-like sheet in the step (4).

In one embodiment, the viscosity of the liquid solvent as measured at 25° C. ranges from about 30 cSt to about 500 cSt, or from about 30 cSt to about 200 cSt. Although the viscosity is not critical, the viscosity at 25° C. of less than about 30 cSt tends to cause foaming, resulting in difficulty in blending. When it is more than about 500 cSt, it can be difficult to remove the liquid solvent in the step (5).

Although not a limiting example, to prepare a polyolefin solution comprising a relatively high concentration of polyethylene and polypropylene, thermal dissolution of the polyethylene resin, the polypropylene resin, and the membrane-forming solvent is carried out in such a manner that they are dissolved at a temperature at which the polyolefin or polyolefin composition completely dissolves with stirring or uniformly mixing in an extruder. When dissolution is carried out in an extruder or with stirring in a solvent, the dissolution temperature varies depending on the polymer and solvent used, and, for example, it is preferably in the range of 140 to 250° C. When a microporous membrane is produced from a high-concentration solution of the polyolefin or polyolefin composition, dissolution is preferably carried out in an extruder. Description of the method of melt blending is omitted because it is already known. For example, the method using a twin-screw extruder described in the specifications of Japanese Patent No. 2132327 and Japanese Patent No. 3347835 can be used as the method of melt blending. The membrane-forming solvent may be added before starting blending or during blending. For example, the solvent can be added during blending at some midpoint of the twin-screw extruder. The resin may be dry-mixed before melt blending, and the solvent can be added before, during, or after the dry-mixing. Provided that the concentration of the polyolefin resin in the polyolefin resin solution is 20 to 50% by mass, preferably 25 to 45% by mass, based on 100% by mass of the total amount of the polyolefin resin and the membrane-forming solvent. When the percentage of the polyolefin resin is less than 20% by mass, productivity decreases, which is not preferred. When the percentage of the polyolefin resin is more than 50% by mass, moldability of the gel-like molding is reduced.

The ratio of the length (L) to the diameter (D) of a screw of the twin-screw extruder (L/D) is preferably in the range of 20 to 100, and more preferably in the range of 35 to 70. An L/D of less than 20 results in insufficient melt-blending. An L/D of more than 100 leads to an excessively prolonged residence time of the polyolefin resin solution. The screw may be of any shape and may be of known shape. The cylinder bore of the twin-screw extruder is preferably 40 to 100 mm. When introducing the polyolefin resin into the twin-screw extruder, the ratio of a feed rate Q of the polyolefin resin solution (kg/h) to a screw rotation speed Ns (rpm) (Q/Ns) is preferably 0.1 to 0.55 kg/h/rpm. If Q/Ns is less than 0.1 kg/h/rpm, the polyolefin resin will experience excessive shear failure, leading to decrease in strength and meltdown temperature. If Q/Ns is more than 0.55 kg/h/rpm, uniform blending cannot be achieved. The ratio Q/Ns is more preferably 0.2 to 0.5 kg/h/rpm. The screw rotation speed Ns is preferably 180 rpm or more. The upper limit of the screw rotation speed Ns is not critical, and it is preferably 500 rpm.

(2) Formation of Gel-Like Molding

The polyolefin resin solution is extruded through a die via the extruder, and cooled to form a gel-like molding. Description of the method of extrusion and the method of forming a gel-like molding is omitted because they are already known. The methods disclosed, for example, in Japanese Patent No. 2132327 and Japanese Patent No. 3347835 can be used. When the shear rate from a T-die and the cooling rate are not controlled appropriately, the distribution of PP in the gel-like molding is less likely to be uniform; thus it is preferred that the shear rate from a T-die be 60/sec or more, and the cooling rate be 30° C. or higher. The gel-like sheet can be cooled by any method such as directly contacting with cold air, cooling water, or any other cooling medium; contacting with a roll cooled with a cooling medium; or the like.

(3) First Stretching

The obtained gel-like molding in the form of a sheet is stretched in at least one direction. The first stretching causes cleavage between PE crystal lamellas, and the PE phase becomes finer, forming large numbers of fibrils. The resulting fibrils form a three-dimensional network structure (three-dimensionally and irregularly connected network structure). The gel-like molding can be uniformly stretched because it contains the membrane-forming solvent. The first stretching can be carried out at a predetermined magnification using a conventional tenter method, roll method, inflation method, rolling method, or a combination of these methods after the gel-like molding is heated. The first stretching may be monoaxial stretching or biaxial stretching, and biaxial stretching is preferred. In the case of biaxial stretching, either simultaneous biaxial stretching or stepwise stretching may be conducted.

The stretching magnification varies depending on the thickness of the gel-like molding, and in the case of monoaxial stretching, it is preferably 2-fold or more, more preferably 3- to 30-fold. In the case of biaxial stretching, it is preferably at least 3-fold or more in both directions, i.e., 9-fold or more in area magnification to improve pin puncture strength. An area magnification of less than 9-fold results in insufficient stretching, and a high-modulus and high-strength polyolefin microporous membrane cannot be obtained. An area magnification of more than 400-fold puts restrictions on stretching apparatuses, stretching operation, and the like.

The first stretching temperature is preferably in the range from the crystal dispersion temperature of the polyolefin resin to the crystal dispersion temperature+30° C., more preferably in the range from the crystal dispersion temperature+10° C. to the crystal dispersion temperature+25° C., and particularly preferably in the range from the crystal dispersion temperature+15° C. to the crystal dispersion temperature+20° C. A stretching temperature of higher than the crystal dispersion temperature+30° C. worsens the orientation of molecular chains after stretching. On the other hand, a stretching temperature of lower than the crystal dispersion temperature leads to poor softening of the resin, which results in that the membrane is likely to be ruptured by stretching, thus failing to achieve high-magnification stretching. The crystal dispersion temperature herein refers to a value determined by measuring temperature characteristics of dynamic viscoelasticity according to ASTM D4065. When PE is used as a principal component of the polyolefin resin, its crystal dispersion temperature is generally 90 to 100° C. Therefore, when the polyolefin resin comprises 90% by mass or more of PE, the stretching temperature is set generally in the range of 90 to 130° C., preferably in the range of 100 to 125° C., and more preferably in the range of 105 to 120° C.

In the first stretching, multi-stage stretching using different temperatures may be conducted. In this case, the stretching is preferably carried out at two stages using different temperatures where the temperature in the latter stage is higher than the temperature in the former stage. As a result, a microporous membrane with a higher order structure having a large pore size and showing high permeability is produced without reducing the strength or degrading the physical properties in the width direction. The difference in stretching temperature between the former stage and the latter stage is preferably 5° C. or more, but is not limited thereto. In raising the temperature of the membrane from the former stage to the latter stage, (a) the temperature may be raised while continuing the stretching, or (b) the stretching may be halted during raising the temperature, and the stretching at the latter stage may be started after a predetermined temperature is reached; the former (a) is preferred. In any case, the temperature is preferably raised by rapid heating. Specifically, heating is preferably carried out at a temperature rise rate of 0.1° C./sec or more, more preferably at a temperature rise rate of 1 to 5° C./sec. Needless to say, the stretching temperatures in the former stage and the latter stage and the total stretching magnification each shall be within the ranges described above.

Depending on the desired physical properties, stretching may be conducted with a temperature distribution in the thickness direction, whereby a polyolefin microporous membrane with more excellent mechanical strength is provided. For example, the method disclosed in Japanese Patent No. 3347854 can be used.

(4) Removal of Membrane-Forming Solvent

A washing solvent is used to remove (wash off) the membrane-forming solvent. Since the polyolefin phase is phase-separated from the membrane-forming solvent, removing the membrane-forming solvent provides a porous membrane. Description of the washing solvent and the method of removing the membrane-forming solvent using the same is omitted because they are already known. For example, the methods disclosed in Japanese Patent No. 2132327 specification and JP 2002-256099 A can be used.

(5) Drying of Membrane

The microporous polyolefin membrane obtained by removing the membrane-forming solvent is dried, for example, by heat-drying or air-drying.

(6) Second Stretching

The dried membrane may be stretched again in at least one direction. The second stretching can be carried out by the tenter method or the like similarly to the first stretching while heating the membrane. The second stretching may be monoaxial stretching or biaxial stretching.

The second stretching temperature is preferably in the range from the crystal dispersion temperature of the polyolefin resin constituting the microporous membrane to the crystal dispersion temperature+40° C., more preferably in the range from the crystal dispersion temperature+10° C. to the crystal dispersion temperature+40° C. A second stretching temperature of higher than the crystal dispersion temperature+40° C. can reduce permeability and increase the variation of physical properties in the sheet width direction when stretching is carried out in the transverse direction (width direction: TD). In particular, it increases the variation of air permeability in the width direction of the stretched sheet. On the other hand, a second stretching temperature of lower than the crystal dispersion temperature leads to poor softening of the polyolefin resin, which results in that the membrane is likely to be ruptured in stretching, thus failing to achieve uniform stretching. When the polyolefin resin comprises PE, the stretching temperature is generally in the range of 90 to 140° C., preferably in the range of 100 to 140° C.

The second stretching magnification in one direction is preferably 1.1- to 1.8-fold. For example, in the case of monoaxial stretching, it is 1.1- to 1.8-fold in the longitudinal direction (machine direction: MD) or TD. In the case of biaxial stretching, it is 1.1- to 1.8-fold in both MD and TD. In the case of biaxial stretching, stretching magnifications in MD and TD may be different from each other as long as they are 1.1- to 1.8-fold. A magnification of less than 1.1-fold cannot produce the effect of improving permeability, injection of electrolyte, and compression resistance. On the other hand, a magnification of more than 1.8-fold leads to too thin fibrils, and moreover, cannot improve heat shrinkage resistance or injection of electrolyte. The second stretching magnification is more preferably 1.2 to 1.6-fold.

The second stretching rate is preferably 3%/sec or more in the stretching direction. For example, in the case of monoaxial stretching, it is 3%/sec or more in MD or TD. In the case of biaxial stretching, it is 3%/sec or more in both MD and TD. The stretching rate (%/sec) in the stretching direction refers to a length growth rate per second relative to the length in the stretching direction before re-stretching (100%) in a region where a membrane (sheet) is re-stretched. A stretching rate of less than 3%/sec can reduce permeability and increase the variation of physical properties in the sheet width direction when stretching is carried out in TD. In particular, it increases the variation of air permeability in the width direction of the stretched sheet. The second stretching rate is preferably 5%/sec or more, more preferably 10%/sec or more. In the case of biaxial stretching, stretching rates in MD and TD may be different from each other as long as they are 3%/sec or more, but they are preferably the same. The upper limit of the second stretching rate is not critical, and it is preferably 50%/sec or less from the standpoint of preventing breakage.

(7) Heat Treatment

The membrane after the second stretching is heat treated. The heat treatment may be carried out by heat setting and/or heat relaxing. In particular, heat setting stabilizes crystals in the membrane. Consequently, the network structure of fibrils formed by the second stretching is retained, and a microporous membrane with a large pore size and high strength can be produced. The heat setting is carried out within a temperature range from the crystal dispersion temperature to the melting point of the polyolefin resin constituting the microporous membrane. The heat setting is carried out by a tenter method, roll method, or rolling method.

The heat setting temperature is preferably in the range of the second stretching temperature±5° C., where physical properties are stabilized. This temperature is more preferably in the range of the second stretching temperature±3° C. For the heat relaxing, for example, the method disclosed in JP 2002-256099 A can be used.

Although not a limiting example, it is preferable to employ the in-line system in which the first stretching, the membrane-forming solvent removal, the drying, the second stretching, and the heat treatment are continuously conducted in one line. However, if necessary, the off-line system may be employed in which the dried membrane is once made into a roll film, and this film is subjected to the second stretching and the heat treatment while being unwound.

(8) Other Steps (a) Heat Setting Treatment Before Washing, After Washing, and During Second Stretching, Hot Roll Treatment, and Hot Solvent Treatment Any one of a heat setting treatment step, a hot roll treatment step, and a hot solvent treatment step can be conducted before removing the membrane-forming solvent from the gel-like molding subjected to the first stretching. The step of heat-setting the membrane after washing or during the second stretching can also be conducted.

(i) Heat Setting

The method of heat setting the stretched gel-like molding before and/or after washing and the membrane during the second stretching may be the same as above.

(ii) Hot Roll Treatment

Treatment in which at least one plane of the stretched gel-like molding before washing is brought into contact with a hot roll (hot roll treatment) may be conducted. For the hot roll treatment, for example, the method described in JP 2007-106992 A can be used. In the method described in JP 2007-106992 A, the stretched gel-like molding is brought into contact with a heating roll controlled at not less than the crystal dispersion temperature of the polyolefin resin+10° C. but less than the melting point of the polyolefin resin. The contact time of the heating roll with the stretched gel-like molding is preferably 0.5 seconds to 1 minute. The contact may be performed with hot oil held on the roll surface. The heating roll may be a flat roll or a rough-surface roll that that may have suction function.

(iii) Hot Solvent Treatment

Treatment in which the stretched gel-like molding before washing is brought into contact with hot solvent may be conducted. For the hot solvent treatment, for example, the method disclosed in WO 2000/20493 can be used.

(b) Cross-Linking of Membrane

The polyolefin microporous membrane after heat treatment may be subjected to cross-linking treatment with ionizing radiation using alpha-rays, beta-rays, gamma-rays, electron beams, or the like, whereby the meltdown temperature can be improved. This treatment can be carried out at an electron dose of 0.1 to 100 Mrad and an accelerating voltage of 100 to 300 kV.

(c) Hydrophilizing

The polyolefin microporous membrane after heat treatment may be hydrophilized by monomer-grafting treatment, surfactant treatment, corona-discharging treatment, plasma treatment, or the like.

(d) Surface Coating

By coating the surface of the polyolefin microporous membrane after heat treatment with a porous body of fluororesin such as polyvinylidene fluoride or polytetrafluoroethylene or a porous body of PA, PAI, PI, PPS, or the like, its meltdown property is improved when the membrane is used as a battery separator. A covering layer containing PP may be formed on at least one plane of the polyolefin microporous membrane after the second stretching. Examples of the PP for covering include one disclosed in WO 2005/054350.

[3] Structure and Physical Properties of Polyolefin Microporous Membrane

The polyolefin microporous membrane of the present invention has a uniform PP distribution in at least one plane perpendicular to the thickness direction. For example, uniformity of PP distribution can be expressed as a structure in which a normalized PP/PE ratio, which is a value relative to the maximum PP/PE ratio on the membrane surface determined by micro-Raman spectroscopy, has specific values of average value/standard deviation/kurtosis. In other words, the polyolefin microporous membrane of the present invention has a normalized PP/PE ratio whose average value is 0.5 or more, standard deviation is 0.2 or less, and kurtosis, a parameter showing a distribution profile, is 1.0 or less. Further, the polyolefin microporous membrane of the present invention preferably has a normalized PP/PE ratio whose average value is 0.6 or more, standard deviation is 0.15 or less, and kurtosis is 0.5 or less.

The method of measuring the PP/PE ratio on the membrane surface using micro-Raman spectroscopy will now be described.

Using micro-Raman spectroscopy, area analysis is performed with 532-nm laser in a field of view of 20×20 micron at a spot diameter of 1 micron to determine the peak intensity ratio of 807 cm$^{-1}$ (PP) to 1,127 cm$^{-1}$ (PE) at total of 400 points. A value relative to the maximum value of the intensity ratio in the field of view of 20×20 micron is defined as "normalized PP/PE ratio". An average value of the normalized PP/PE ratio of smaller than 0.5 suggests that many low PP concentration portions exist, increasing portions composed mainly of PE, and oxidation reaction associated with charge and discharge in a battery promotes degradation at the portions composed mainly of PE, leading to deteriorated cycle characteristics. A standard deviation of more than 0.2 suggests that a distribution of PP concentration is wide, and oxidation resistance is poor at the low PP concentration portions, resulting in poor improvement in oxidation resistance. Also when a distribution of PP concentration is wider than the normal distribution (kurtosis <−1), low PP concentration portions exist, causing portions having poor oxidation resistance in a battery, which leads to degraded battery performance. Further, when a distribution of PP concentration is narrower than the normal distribution (kurtosis >1), oxidation resistance is poor although the reason is not clear. The existence of some degree of high PP concentration portions can be necessary for oxidation resistance improvement. These results show that an appropriate normalized PP/PE ratio distribution is necessary for oxidation resistance improvement of the microporous membrane.

The polyolefin microporous membrane of the present invention has excellent oxidation resistance because of having a uniform PP distribution in at least one plane perpendicular to the thickness direction as described above, and has excellent permeability, strength, and injection of electrolyte because the amount of PP added is as small as less than 5% by mass, and degradation of physical properties due to PP addition is not caused. Thus, when the polyolefin microporous membrane of the present invention is used as a lithium ion battery separator, excellent battery productivity, safety, and battery cycle characteristics can be achieved.

The polyolefin microporous membrane according to a preferred embodiment of the present invention has the following physical properties.

(1) The polyolefin microporous membrane has an air permeability (Gurley value) of 20 to 500 sec/100 cm$^3$ in terms of 20-µm thickness. When the air permeability is in this range, a large battery capacity is provided when the microporous membrane is used as a battery separator, and the battery also has good cycle characteristics. If the air permeability is less than 20 sec/100 cm$^3$/20 µm, sufficient shutdown is not executed when the temperature inside a battery is elevated. The air permeability is a value determined by measuring a Gurley value in accordance with JIS P 8117 and converting the value in terms of 20-µm thickness.

(2) The polyolefin microporous membrane has a porosity of 25 to 80%. When the porosity is less than 25%, a satisfactory air permeability cannot be provided. When the porosity is more than 80%, the microporous membrane has poor strength when used as a battery separator, and electrodes are highly likely to short-circuit. The porosity is a value determined by a mass method. Namely, porosity (%)=100×$(w_2-w_1)/w_2$, wherein "$w_1$" is an actual weight of the membrane, and "$w_2$" is the weight of an equivalent non-porous membrane (of the same polymer) having the same size and thickness.

(3) The polyolefin microporous membrane has a pin puncture strength of 2,000 mN or more in terms of 20-µm thickness. When the pin puncture strength is less than 2,000 mN/20 µm, a short circuit between electrodes can occur when the microporous membrane is incorporated into a battery as a battery separator. The pin puncture strength is preferably 2,500 mN/20 µm or more. The pin puncture strength is a value determined by measuring a maximum load value when the polyolefin microporous membrane is pricked with a needle of 1 mm in diameter (0.5 mm R) at a speed of 2 mm/sec, and converting the value in terms of 20-µm thickness.

(4) The polyolefin microporous membrane has a tensile rupture strength of 60,000 kPa or more in both MD and TD. This eliminates the possibility of membrane rupture. The tensile rupture strength is a value determined in accordance with ASTM D882 using a strip test piece 10 mm in width.

(5) The polyolefin microporous membrane has a tensile rupture elongation of 80% or more in both MD and TD. This eliminates the possibility of membrane rupture. The tensile rupture elongation is a value determined in accordance with ASTM D882 using a strip test piece 10 mm in width.

(6) The polyolefin microporous membrane has a heat shrinkage rate after 8-hour exposure at a temperature of 105° C. of 10% or less in both MD and TD. If the heat shrinkage rate exceeds 10%, when the microporous membrane is used as a lithium battery separator, the edges of the separator shrink upon heat generation, increasing the possibility of a short circuit between electrodes. The heat shrinkage rate is preferably 8% or less in both MD and TD. The heat shrinkage rate is a value determined by measuring a shrinkage rate in MD and TD after exposing the microporous membrane at 105° C. for 8 hours three times each and calculating its average value.

(7) The injection of electrolyte was evaluated as "good" when it was 20 seconds or less. When the injection of electrolyte was more than 20 seconds, it was evaluated as "poor". The injection of electrolyte was evaluated by permeation time of propylene carbonate. From about 2 cm above a sample film, 0.5 ml of propylene carbonate is dropped, and timing is started after completion of the dropping. The propylene carbonate swells on the membrane because of surface tension. The dropped propylene carbonate permeates into the membrane, and when all the propylene carbonate on the membrane has penetrated therethrough, timing is stopped to determine the permeation time.

(8) Electrochemical stability of the microporous membrane determined by a battery test has the units of mAh, and a lower value, representing less integrated charge loss during high-temperature storage or overcharging, is generally desired. Specifically, it is preferably 45.0 mAh or less.

Electrochemical stability is a membrane property related to the membrane's oxidation resistance when the membrane is used as a separator in a battery (hereinafter referred to as BSF) exposed to a relatively high temperature during storage or use. For automotive batteries, such as those used for starting or powering motor means for moving an electric vehicle or hybrid electric vehicle, and for power tool batteries, an electrochemical stability of 45.0 mAh or less is desired since those relatively high power and high capacity applications are particularly sensitive to any loss in battery capacity, such as self-discharge losses resulting from electrochemical instability of the BSF. The term "high-capacity" batteries generally means batteries capable of supplying 1 Ampere hour (1 Ah) or more, e.g., 2.0 Ah to 3.6 Ah.

To measure electrochemical stability, a battery is assembled in which a membrane having a length (MD) of 70 mm and a width (TD) of 60 mm is located between an anode and cathode having the same planar dimensions as the membrane. The anode is made of natural graphite, and the cathode is made of $LiCoO_2$. An electrolyte is prepared by dissolving $LiPF_6$ into a mixture of ethylene carbonate (EC) and dimethyl carbonate (DMC) (3/7, V/V) as 1 M solution. The electrolyte is impregnated into the membrane in the region between the anode and the cathode to complete the battery.

The battery is then exposed to an applied voltage of 4.3V while exposed to a temperature of 60° C. for 28 days. The term "electrochemical stability" is defined as an integrated current (in mAh) flowing between the voltage source and the battery over the 28-day period. Electrochemical stability is generally measured three times under substantially identical conditions (three substantially identical batteries produced from three substantially identical BSF samples). The numerical average (arithmetic mean) of the three measured electrochemical stability values is the "average electrochemical stability."

(9) The membrane, for example when used as a battery separator, preferably has a thickness of 5 to 50 µm, more preferably 5 to 35 µm. The thickness may be measured by a contact thickness measurement method or a non-contact thickness measurement method. The thickness can be measured, e.g., with a contact thickness meter at 1.0-cm intervals in the machine direction over the width of 10.0 cm, and then averaged to yield the thickness. Contact thickness meters such as "Litematic" (registered trademark) available from Mitsutoyo Corporation are suitable.

(10) For film appearance, those having less thickness irregularities are preferred. The film appearance is evaluated by visual observation/multipoint thickness measurement. When it is judged by visual observation that there is great change in thickness, the film appearance is evaluated as "poor", which corresponds to the case where there is a thickness change of 5 micron or more in multipoint thickness measurement. When the thickness change is less than 5 micron in multipoint thickness measurement, the film appearance is evaluated as "good".

As described above, the microporous membrane of the present invention is less likely to blacken even after repeating charge and discharge in a battery, and has excellent permeability, mechanical properties, and heat shrinkage resistance; thus it is suitable particularly as a battery separator.

[4] Battery

A separator made of the polyolefin microporous membrane of the present invention can be used in batteries and electric double layer capacitors. The separator may be used in any battery/capacitor, and is suitable particularly for lithium secondary battery/lithium ion capacitor applications. Known electrodes and electrolyte solutions may be used for lithium secondary batteries/capacitors including a separator made of the microporous membrane of the present invention. Further, lithium secondary batteries/capacitors including a separator made of the microporous membrane of the present invention may be of known structure.

EXAMPLES

The present invention will now be described in more detail with reference to the following examples, but the present invention is not limited to these examples. Physical properties of the polyolefin microporous membrane were determined by the methods mentioned above.

Example 1

A polyolefin resin comprising 18% by mass of UHMwPE having a Mw of $2.0 \times 10^6$ (Mw/Mn: 8), 77.1% by mass of HDPE having a Mw of $2.5 \times 10^5$ (Mw/Mn: 8.6), and 4.9% by mass of PP having a Mw of $9.7 \times 10^4$ (Mw/Mn: 2.6) was dry-blended with 0.2 parts by mass (based on 100 parts by mass of PE) of an antioxidant tetrakis[methylene-3-(3,5- ditertiarybutyl-4-hydroxyphenyl)-propionate]methane to prepare a polyolefin composition.

Twenty-five parts by mass of the polyolefin composition obtained was charged into a twin-screw extruder (cylinder bore: 58 mm, the ratio of the length (L) to the diameter (D) of a screw (L/D): 42, strong blending type). Seventy-five parts by mass of liquid paraffin [50 cSt (40° C.)] was fed to the twin-screw extruder via a side feeder, and melt-blended under the conditions of 210° C. and 200 rpm to prepare a PE solution in the twin-screw extruder. The PE solution obtained was extruded through a T-die mounted at the end of the twin-screw extruder and taken up with a cooling roll controlled at 20° C. to form a gel-like molding. The gel-like molding obtained was subjected to 5×5-fold simultaneous biaxial stretching (the first stretching) at a temperature of 115° C. using a tenter stretching machine. The stretched membrane was then fixed to a frame [size: 20 cm×20 cm, aluminum (the same shall apply hereinafter)], immersed in a washing bath of methylene chloride controlled at 25° C., and washed with a vibration of 100 rpm for 3 minutes. The washed membrane was air-dried at room temperature. The dried stretched membrane was heat set at 125° C. for 30 seconds to prepare a polyolefin microporous membrane.

The Mw and Mw/Mn of the resin was determined from an integral curve obtained by gel permeation chromatography (GPC) [measuring apparatus: GPC-150C available from Waters Corporation, temperature: 135° C., solvent: o-dichlorobenzene, concentration: 0.1% by mass (injection amount: 500 μl), column: Shodex UT806M available from SHOWA DENKO K.K., solvent flow rate: 1.0 ml/min, dissolution conditions: 135° C./hr. A calibration curve was generated using a polystyrene calibration curve determined by measurement of a standard sample of monodisperse polystyrene. The same shall apply hereinafter.].

For injection of electrolyte, a permeation time of 20 seconds or less was evaluated as good, and a permeation time of more than 20 seconds as poor.

Example 2

As shown in Table 1, a polyolefin microporous membrane was prepared in the same manner as in Example 1 except that a polyolefin resin comprising 18% by mass of UHMwPE having a Mw of $2.0 \times 10^6$ (Mw/Mn: 8), 79% by mass of HDPE having a Mw of $2.5 \times 10^5$ (Mw/Mn: 8.6), and 3% by mass of PP having a Mw of $9.7 \times 10^4$ (Mw/Mn: 2.6) was used.

Example 3

As shown in Table 1, a polyolefin microporous membrane was prepared in the same manner as in Example 1 except that a polyolefin resin comprising 18% by mass of UHMwPE having a Mw of $2.0 \times 10^6$ (Mw/Mn: 8), 81% by mass of HDPE having a Mw of $2.5 \times 10^5$ (Mw/Mn: 8.6), and 1% by mass of PP having a Mw of $9.7 \times 10^4$ (Mw/Mn: 2.6) was used.

Example 4

As shown in Table 1, a polyolefin microporous membrane was prepared in the same manner as in Example 1 except that a polyolefin resin comprising 18% by mass of UHMwPE having a Mw of $2.0 \times 10^6$ (Mw/Mn: 8), 81.5% by mass of HDPE having a Mw of $2.5 \times 10^5$ (Mw/Mn: 8.6), and 0.5% by mass of PP having a Mw of $9.7 \times 10^4$ (Mw/Mn: 2.6) was used.

Example 5

As shown in Table 1, a polyolefin microporous membrane was prepared in the same manner as in Example 1 except that a polyolefin resin comprising 18% by mass of UHMwPE having a Mw of $2.0 \times 10^6$ (Mw/Mn: 8), 77.1% by mass of HDPE having a Mw of $2.5 \times 10^5$ (Mw/Mn: 8.6), and 4.9% by mass of PP having a Mw of $2.7 \times 10^5$ (Mw/Mn: 4.4) was used.

Comparative Example 1

As shown in Table 1, a polyolefin microporous membrane was prepared in the same manner as in Example 1 except that a polyolefin resin comprising 18% by mass of UHMwPE (Mw: $2.0 \times 10^6$, Mw/Mn: 8), 77.1% by mass of HDPE (Mw: $3.5 \times 10^5$, Mw/Mn: 8.6), and 5% by mass PP having a Mw of $4.9 \times 10^5$ (Mw/Mn: 10.6) was used, and the resin concentration was 25% by mass.

Comparative Example 2

As shown in Table 1, a polyolefin solution was prepared in the same manner as in Example 1 except that a polyolefin resin comprising 18% by mass of UHMwPE (Mw: $2.0 \times 10^6$, Mw/Mn: 8), 77% by mass of HDPE (Mw: $3.5 \times 10^5$, Mw/Mn: 8.6), and 5% by mass of PP having a Mw of $5.8 \times 10^6$ (Mw/Mn: 2.1) was used. Thereafter, a polyolefin microporous membrane was prepared in the same manner as in Example 1.

Comparative Example 3

As shown in Table 1, a polyolefin solution was prepared in the same manner as in Example 1 except that a polyolefin resin comprising 18% by mass of UHMwPE (Mw: $2.0 \times 10^6$, Mw/Mn: 8), 81.7% by mass of HDPE (Mw: $3.5 \times 10^5$, Mw/Mn: 8.6), and 0.3% by mass of PP having a Mw of $9.7 \times 10^4$ (Mw/Mn: 2.6) was used. Using the polyolefin solution obtained, a polyolefin microporous membrane was prepared in the same manner as in Example 1.

Comparative Example 4

As shown in Table 1, a polyolefin solution was prepared in the same manner as in Example 1 except that a polyolefin resin comprising 18% by mass of UHMwPE (Mw: $2.0 \times 10^6$, Mw/Mn: 8), 72% by mass of HDPE (Mw: $3.5 \times 10^5$, Mw/Mn: 8.6), and 10% by mass of PP having a Mw of $9.7 \times 10^4$ (Mw/Mn: 2.6) was used. Using the polyolefin solution obtained, a polyolefin microporous membrane was prepared in the same manner as in Example 1.

Comparative Example 5

A gel-like molding was formed using the same resin composition as in Example 1. As shown in Table 1, the shear rate during molding was adjusted to 55/sec. Thereafter, a polyolefin microporous membrane was prepared in the same manner as in Example 1.

Comparative Example 6

A gel-like molding was formed using the same resin composition as in Example 1. As shown in Table 1, the cooling rate was adjusted to 23° C./sec. Thereafter, a polyolefin microporous membrane was prepared in the same manner as in Example 1.

Figure 2:
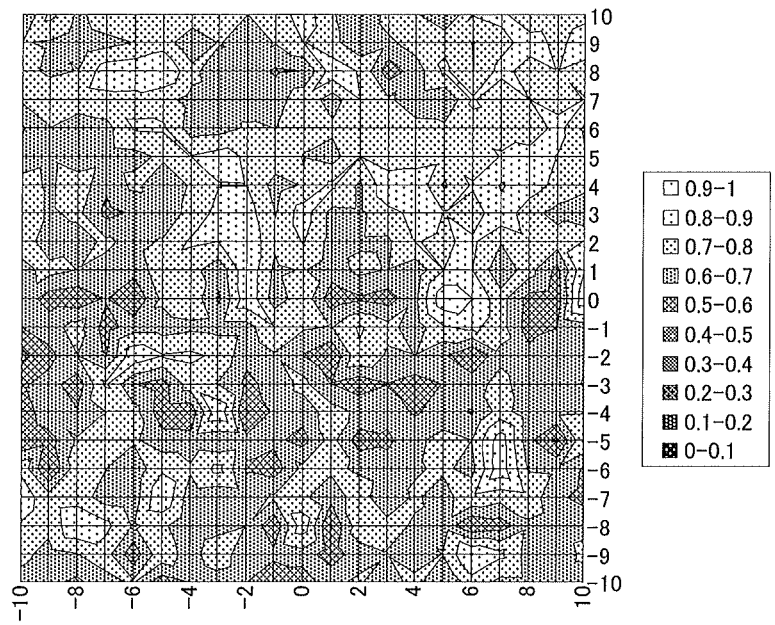
FIG. 2 is a two-dimensional distribution map of the normalized PP/PE ratio of Example 1.

For the polyolefin microporous membranes obtained in Examples 1 to 5 and Comparative Examples 1 to 4, their air permeability, porosity, pin puncture strength, tensile rupture strength, tensile rupture elongation, heat shrinkage rate, injection of electrolyte, normalized PP/PE ratio, standard deviation thereof, kurtosis of normalized PP/PE ratio distribution, electrochemical stability after 120 hours from the start of a trickle charge test using a small battery, and film appearance were each measured by the methods (1) to (10) described above and recorded. The results are shown in Tables 1 to 2. For the microporous membrane of Example 1, a distribution chart and a two-dimensional map of normalized PP/PE ratio are shown in FIGS. 1 to 2.

TABLE 1

| | | | Example 1 | Example 2 | Example 3 | Example 4 | Example 5 |
|---|---|---|---|---|---|---|---|
| PO resin composition | | | | | | | |
| UHMwPE | Molecular weight (Mw) | | $2.0 \times 10^6$ | $2.0 \times 10^6$ | $2.0 \times 10^6$ | $2.0 \times 10^6$ | $2.0 \times 10^6$ |
| | Mw/Mn | | 8 | 8 | 8 | 8 | 8 |
| | content | (wt %) | 18 | 18 | 18 | 18 | 18 |
| HDPE | Molecular weight (Mw) | | $2.5 \times 10^5$ | $2.5 \times 10^5$ | $2.5 \times 10^5$ | $2.5 \times 10^5$ | $2.5 \times 10^5$ |
| | Mw/Mn | | 8.6 | 8.6 | 8.6 | 8.6 | 8.6 |
| | content | (wt %) | 77.1 | 79 | 81 | 81.5 | 77.1 |
| PP | Molecular weight (Mw) | | $9.7 \times 10^4$ | $9.7 \times 10^4$ | $9.7 \times 10^4$ | $9.7 \times 10^4$ | $2.7 \times 10^5$ |
| | Mw/Mn | | 2.6 | 2.6 | 2.6 | 2.6 | 4.4 |
| | content | (wt %) | 4.9 | 3 | 1 | 0.5 | 4.9 |
| | Melting point | (° C.) | 155 | 155 | 155 | 155 | 161 |
| Manufacturing conditions | | | | | | | |
| Melt kneaded resin concentration | | (wt %) | 25 | 25 | 25 | 25 | 25 |
| Shearing speed | | (/sec) | 200 | 187 | 194 | 200 | 180 |
| Cooling speed | | (° C./sec) | 36.6 | 36.6 | 30 | 38.3 | 41.7 |
| The first stretching | Temperature | (° C.) | 115 | 115 | 115 | 115 | 115 |
| | Magnification (MD × TD) | | 5 × 5 | 5 × 5 | 5 × 5 | 5 × 5 | 5 × 5 |
| Thermo fix treatment after washing | Temperature | (° C.) | 125 | 125 | 125 | 125 | 125 |
| | Time | (sec) | 10 | 10 | 10 | 10 | 10 |
| Microporous membrane properties | | | | | | | |
| Membrane thickness | | (μm) | 23 | 18 | 24 | 21 | 17 |
| Air permeability | (sec/100 cm³/20 μm) | | 363 | 395 | 368 | 318 | 544 |
| Porosity | | (%) | 40 | 39 | 41 | 41 | 36 |
| Pin puncture strength | | (g/20 μm) | 361 | 329 | 380 | 379 | 408 |
| | | (mN/20 μm) | 3540 | 3226 | 3727 | 3717 | 4001 |
| Tensile rupture strength | MD | (kg/cm²) | 895 | 1140 | 1245 | 1115 | 920 |
| | | (kPa) | 87770 | 111800 | 122090 | 109340 | 90220 |
| | TD | (kg/cm²) | 1185 | 970 | 1140 | 1080 | 915 |
| | | (kPa) | 116210 | 95130 | 111800 | 105910 | 89730 |
| Tensile rupture elongation | MD | (%) | 145 | 110 | 115 | 95 | 140 |
| | TD | (%) | 115 | 135 | 95 | 85 | 145 |
| Heat shrinkage ratio | MD | (%) | 3.1 | 3.1 | 3.2 | 3.1 | 3.2 |
| | TD | (%) | 2.8 | 3.5 | 2.8 | 3.6 | 2.7 |
| Injection of electrolyte | | | good | good | good | good | good |
| Normalized PP/PE ratio | average | | 0.70 | 0.67 | 0.61 | 0.55 | 0.64 |
| | standard deviation | | 0.095 | 0.11 | 0.11 | 0.12 | 0.09 |
| | kurtosis | | 0.2 | 0.2 | 0.2 | 0.3 | 0.84 |
| Electrochemical stability | | (mAh) | 29 | 28 | 22 | 27 | 27 |
| Film appearance | | | good | good | good | good | good |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| PO resin composition | | | | | | | | |
| UHMwPE | Molecular weight (Mw) | | $2.0 \times 10^6$ | $2.0 \times 10^6$ | $2.0 \times 10^6$ | $2.0 \times 10^6$ | $2.0 \times 10^6$ | $2.0 \times 10^6$ |
| | Mw/Mn | | 8 | 8 | 8 | 8 | 8 | 8 |
| | content | (wt %) | 18 | 18 | 18 | 18 | 18 | 18 |
| HDPE | Molecular weight (Mw) | | $2.5 \times 10^5$ | $2.5 \times 10^5$ | $2.5 \times 10^5$ | $2.5 \times 10^5$ | $2.5 \times 10^5$ | $2.5 \times 10^5$ |
| | Mw/Mn | | 8.6 | 8.6 | 8.6 | 8.6 | 8.6 | 8.6 |
| | content | (wt %) | 77 | 77 | 81.7 | 72 | 77.1 | 77.1 |
| PP | Molecular weight (Mw) | | $4.9 \times 10^5$ | $5.8 \times 10^4$ | $9.7 \times 10^4$ | $9.7 \times 10^4$ | $9.7 \times 10^4$ | $9.7 \times 10^4$ |
| | Mw/Mn | | 10.6 | 2.1 | 2.6 | 2.6 | 2.6 | 2.6 |
| | content | (wt %) | 5 | 5 | 0.3 | 10 | 4.9 | 4.9 |
| | Melting point | (° C.) | 162 | 155 | 155 | 155 | 155 | 155 |
| Manufacturing conditions | | | | | | | | |
| Melt kneaded resin concentration | | (wt %) | 25 | 25 | 25 | 25 | 25 | 25 |
| Shearing speed | | (/sec) | 190 | 167 | 194 | 187 | 55 | 200 |
| Cooling speed | | (° C./sec) | 38.3 | 43.3 | 35 | 41.7 | 36.6 | 23 |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| The first stretching | Temperature | (° C.) | 115 | 115 | 115 | 115 | 115 | 115 |
|  | Magnification (MD × TD) |  | 5 × 5 | 5 × 5 | 5 × 5 | 5 × 5 | 5 × 5 | 5 × 5 |
| Thermo fix treatment after washing | Temperature | (° C.) | 125 | 125 | 125 | 125 | 125 | 125 |
|  | Time | (sec) | 10 | 10 | 10 | 10 | 10 | 10 |
| Microporous membrane properties |  |  |  |  |  |  |  |  |
| Membrane thickness |  | (μm) | 14 | 18 | 19 | 23 | 21 | 19 |
| Air permeability | (sec/100 cm³/20 μm) |  | 1093 | 359 | 394 | 244 | 320 | 280 |
| Porosity |  | (%) | 28 | 41 | 39 | 49 | 41 | 41 |
| Pin puncture strength |  | (g/20 μm) | 463 | 388 | 425 | 309 | 350 | 330 |
|  |  | (mN/20 μm) | 4541 | 3805 | 4168 | 3030 | 3432 | 3236 |
| Tensile rupture strength | MD | (kg/cm²) | 1080 | 1195 | 1015 | 900 | 1210 | 1100 |
|  |  | (kPa) | 105910 | 117190 | 99540 | 88260 | 118660 | 107870 |
|  | TD | (kg/cm²) | 1175 | 980 | 940 | 820 | 1110 | 930 |
|  |  | (kPa) | 115230 | 96110 | 92180 | 80410 | 108850 | 91200 |
| Tensile rupture elongation | MD | (%) | 130 | 100 | 90 | 140 | 120 | 125 |
|  | TD | (%) | 140 | 110 | 105 | 125 | 90 | 125 |
| Heat shrinkage ratio | MD | (%) | 2.7 | 3.5 | 3.3 | 4 | 3.3 | 3.4 |
|  | TD | (%) | 2.4 | 3.4 | 3.6 | 3.8 | 3.1 | 3.5 |
| Injection of electrolyte |  |  | poor | poor | good | — | poor | poor |
| Normalized PP/PE ratio | average |  | 0.64 | 0.50 | 0.48 | — | 0.52 | 0.59 |
|  | Standard deviation |  | 0.10 | 0.09 | 0.09 | — | 0.12 | 0.14 |
|  | kurtosis |  | 0.8 | 1.1 | 0.3 | — | 0.9 | 1 |
| Electrochemical stability |  | (mAh) | 650 | 290 | 48 | — | 63 | 86 |
| Film appearance |  |  | good | good | good | poor | good | good |

Table 1 shows that in Examples 1 to 5, microporous membranes were produced using a polyolefin containing PP in an amount of 0.5 to less than 5% by mass based on 100% by mass of the total amount of the polyolefin. The microporous membranes were all excellent in injection of electrolyte, and their surface PP concentration (average value, standard deviation, and kurtosis) as determined with a micro-Raman spectrometer met the criteria. Their electrochemical stability after 120 hours in a trickle charge test using a small battery was not more than 30 mAh, indicating excellent oxidation resistance. FIG. 1 shows a distribution chart of normalized PP/PE ratio obtained by measuring the membrane shown in Example 1 with a micro-Raman spectrometer. FIG. 2 shows a two-dimensional distribution map of normalized PP/PE ratio of Example 1. FIG. 2 shows that there is not so many low PP concentration regions (dark-colored portions) and PP is present uniformly. In Examples 1 to 4, a microporous membrane that has excellent balance between air permeability, pin puncture strength, tensile rupture strength, tensile rupture elongation, and heat shrinkage resistance, has excellent injection of electrolyte, and inhibits separator oxidation reaction which occurs in a battery can be produced.

Figure 3:
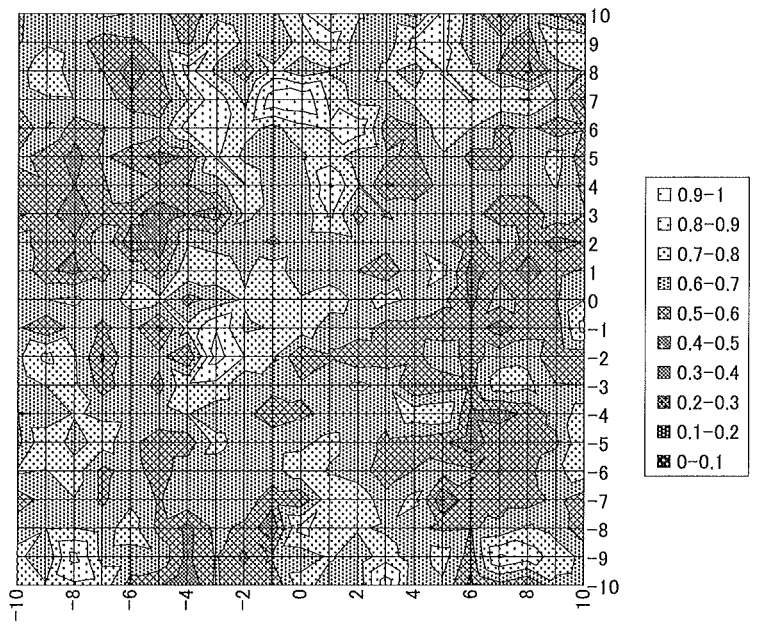
FIG. 3 is a two-dimensional distribution map of the normalized PP/PE ratio of Comparative Example 1.

In contrast, in Comparative Example 1, although the amount of PP was the same as in Examples 1 and 5 and a similar surface PP concentration was exhibited, there were some regions where PP concentration is low (there are more dark-colored portions than in FIG. 2.) as shown in FIG. 3. The results obtained show poor air permeability and poor injection of electrolyte. Probably, the state of PP distribution is different from that of Examples 1 and 5, and PP is present such that pores are blocked.

Figure 4:
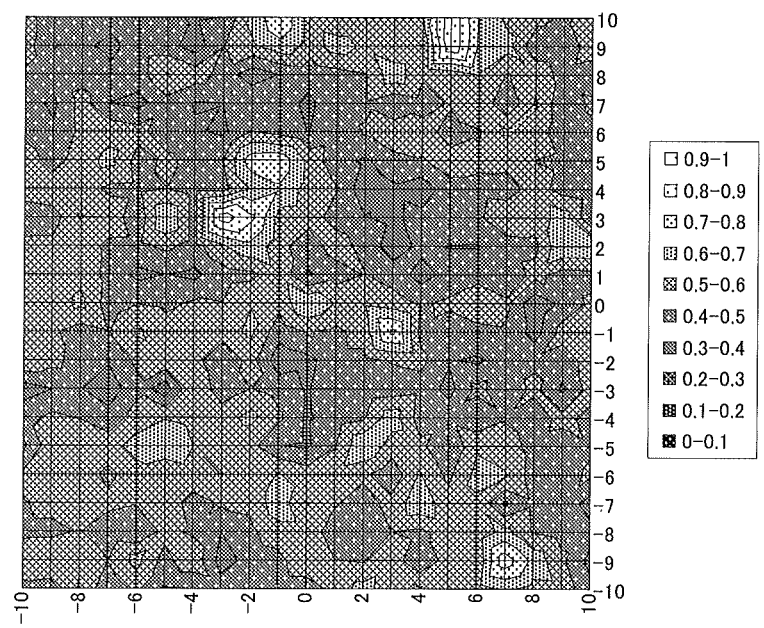
FIG. 4 is a two-dimensional distribution map of the normalized PP/PE ratio of Comparative Example 2.

In Comparative Example 2, although PP was added in the same amount as in Examples 1 and 5 and Comparative Example 1, as can be seen from the low normalized PP/PE ratio, the PP concentration near the surface was low for the PP added as shown in FIG. 4. This is probably the reason that oxidation resistance did not improve.

In Comparative Example 3, the same PP as used in Examples 1 to 4 was used in an amount of 0.3% by mass. Although the distribution (standard deviation, kurtosis) of PP was good, the amount thereof was small, and therefore the PP concentration near the surface was insufficient, which is probably the reason that oxidation resistance did not improve.

In Comparative Example 4, the same PP as in Examples 1 to 4 and Comparative Example 4 was used in an amount of 10% by mass. Air permeability improved and porosity increased, but strength decreased. The appearance of the membrane was irregular by visual observation, confirming that the membrane was poor in terms of general physical properties of a separator.

In Comparative Example 5, the same resin composition as in Example 1 was used. The injection was reduced by decreasing the shear rate from a T-die. Oxidation resistance did not improve probably because the state of PP distribution near the surface changed.

In Comparative Example 6, the same resin composition as in Example 1 was used. The injection was reduced by decreasing the cooling rate. Oxidation resistance did not improve probably because the state of PP distribution near the surface was poor.

INDUSTRIAL APPLICABILITY

A microporous film obtained by the method of producing a microporous film according to the present invention has properties suitable for an electric storage device for non-aqueous electrolyte solution in capacitor applications, battery applications, and the like, and is able to contribute to the improvement of safety and reliability. In particular, it can be suitably used as a battery separator, more specifically, a lithium ion battery separator. It can also be used in other applications such as a component of fuel cells, humidifying membranes, and various separation membranes such as filtration membranes, and therefore has industrial applicability in such fields.

The invention claimed is:

1. A polyolefin microporous membrane produced by forming a gel-like molding using a polyolefin resin comprising 80% or more by mass of polyethylene composition based on 100% by mass of the total amount of the polyolefin and 0.5% or more but less than 5% by mass of polypropylene having a weight average molecular weight of more than $5\times10^4$ but less than $3\times10^5$ based on 100% by mass of the total amount of the polyolefin, wherein the polyethylene composition comprises polyethylene having a mass average molecular weight of from $2.5\times10^5$ to $5\times10^5$ and 18 to 50% by mass of ultra-high molecular weight polyethylene having a mass average molecular weight of $1\times10^6$ to $3\times10^6$ based on 100% by mass of polyethylene composition, and stretching the molding in at least one direction, followed by washing, the polyolefin microporous membrane having an injection of electrolyte of 20 seconds or less and a uniform polypropylene distribution in at least one plane perpendicular to the thickness direction.

2. The polyolefin microporous membrane according to claim 1, having a normalized PP/PE ratio whose average is 0.5 or more, whose standard deviation is 0.2 or less, and whose kurtosis is 1.0 or less, as measured by Raman spectroscopy in at least one plane perpendicular to the thickness direction.

3. The polyolefin microporous membrane according to claim 1, wherein weight average molecular weight of polypropylene is more than 50,000 but less than 150,000.

4. A method of producing the polyolefin microporous membrane according to claim 1, comprising:
   (a) melt blending a polyolefin resin, comprising 18 to 50% by mass of ultra-high molecular weight polyethylene having a mass average molecular weight of to $3\times10^6$ or more, and 0.5% or more but less than 5% by mass of polypropylene having a weight average molecular weight of more than 50,000 but less than 300,000, based on 100% by mass of the total amount of the polyolefin, with a membrane-forming solvent;
   (b) extruding the obtained melt blending through a die at a shear rate of 60/sec or more, and cooling the extrudate at a cooling rate of 30° C./sec or more to form a gel-like molding;
   (c) stretching the obtained gel-like molding in at least one direction; and
   (d) removing the membrane-forming solvent from the obtained stretched product.

5. The polyolefin microporous membrane according to claim 2, wherein weight average molecular weight of polypropylene is more than 50,000 but less than 150,000.

6. A method of producing the polyolefin microporous membrane according to claim 2, comprising:
   (a) melt blending a polyolefin resin, comprising 18 to 50% by mass of ultra-high molecular weight polyethylene having a mass average molecular weight of to $3\times10^6$ or more, and 0.5% or more but less than 5% by mass of polypropylene having a weight average molecular weight of more than 50,000 but less than 300,000, based on 100% by mass of the total amount of the polyolefin, with a membrane-forming solvent;
   (b) extruding the obtained melt blending through a die at a shear rate of 60/sec or more, and cooling the extrudate at a cooling rate of 30° C./sec or more to form a gel-like molding;
   (c) stretching the obtained gel-like molding in at least one direction; and
   (d) removing the membrane-forming solvent from the obtained stretched product.

7. A method of producing the polyolefin microporous membrane according to claim 3, comprising:
   (a) melt blending a polyolefin resin, comprising 18 to 50% by mass of ultra-high molecular weight polyethylene having a mass average molecular weight of to $3\times10^6$ or more, and 0.5% or more but less than 5% by mass of polypropylene having a weight average molecular weight of more than 50,000 but less than 300,000, based on 100% by mass of the total amount of the polyolefin, with a membrane-forming solvent;
   (b) extruding the obtained melt blending through a die at a shear rate of 60/sec or more, and cooling the extrudate at a cooling rate of 30° C./sec or more to form a gel-like molding;
   (c) stretching the obtained gel-like molding in at least one direction; and
   (d) removing the membrane-forming solvent from the obtained stretched product.

* * * * *